(12) United States Patent
Yamazaki

(10) Patent No.: US 8,215,600 B2
(45) Date of Patent: Jul. 10, 2012

(54) CONNECTION STRUCTURE BETWEEN LIFTING DEVICE AND LIFTED BODY

(75) Inventor: Yasuhiro Yamazaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 863 days.

(21) Appl. No.: 12/267,023

(22) Filed: Nov. 7, 2008

(65) Prior Publication Data

US 2009/0120723 A1 May 14, 2009

(30) Foreign Application Priority Data

Nov. 9, 2007 (JP) ................................. 2007-291552

(51) Int. Cl.
A47B 96/00 (2006.01)
(52) U.S. Cl. .......... 248/227.4; 269/55; 269/71; 269/329
(58) Field of Classification Search .................. 403/345, 403/289, 384, 386, 397, 398; 248/227.3, 248/227.4, 230.4, 231.51; 24/270, 71 SK; 269/55, 71, 329
See application file for complete search history.

(56) References Cited

U.S. PATENT DOCUMENTS

| | | | | |
|---|---|---|---|---|
| 4,079,481 A | * | 3/1978 | Cacicedo | 16/253 |
| 5,586,367 A | * | 12/1996 | Benoit | 24/68 SK |
| 5,715,582 A | * | 2/1998 | Zorzi | 24/71 SK |
| 5,758,870 A | * | 6/1998 | Weaver | 269/329 |
| 6,547,482 B2 | * | 4/2003 | Schworer | 403/386 |
| 7,845,599 B2 | * | 12/2010 | Jackson | 248/73 |
| 2004/0065796 A1 | * | 4/2004 | Evans et al. | 248/230.4 |
| 2005/0035249 A1 | * | 2/2005 | Busuito | 248/215 |
| 2010/0108838 A1 | * | 5/2010 | DeMartine et al. | 248/222.14 |

FOREIGN PATENT DOCUMENTS

JP 2006-320978 11/2006

* cited by examiner

Primary Examiner — Daniel P. Stodola
Assistant Examiner — Jonathan Masinick
(74) Attorney, Agent, or Firm — Rankin, Hill & Clark LLP

(57) ABSTRACT

A connection structure between a lifting device and a lifted body is provided wherein lifted body side portions are connected to a pair of lifting bodies moving up and down on the lifted body outer sides. Gripping means provided in each side of a lifted body grip a lifting arm of each lifting body and include a first gripping piece swingably connected to a base rack and a second gripping piece swingably connected to the first gripping piece. When the lifting arm is separated from the lifted body, the first gripping piece is located outwardly of the lifting arm and a gripper is located within a vertical projective space of the lifting arm, and the first gripping piece is lifted via the second gripping piece, by which a gripper abuts against the lifting arm from below.

3 Claims, 5 Drawing Sheets

CONNECTION STRUCTURE BETWEEN LIFTING DEVICE AND LIFTED BODY

BACKGROUND OF THE INVENTION

1. Field of the Invention

The present invention relates to a connection structure between a lifted body such as a humanoid robot and a lifting device for lifting and lowering the lifted body.

2. Description of the Related Art

Conventionally, there is known a lifting device for lifting and lowering a humanoid robot, which is suspended from the lifting device by hoist ropes connected to the shoulders of the humanoid robot (for example, refer to Japanese Patent Application Laid-Open No. 2006-320978). This type of lifting device, however, has a problem of poor appearance caused by suspending the robot and of a limitation in downsizing the lifting device.

Hence, it is conceivable to use a lifting device having a pair of lifting bodies which move up and down on the right and left outer sides of the robot in order to move up and down the robot by lifting and lowering the lifted body, with the lifting bodies fixed by bolts to the right and left side portions of the waist of the robot. The work of fixing the lifting bodies to the robot by bolts, however, requires a lot of trouble and is troublesome.

Therefore, it is alternatively conceivable to provide hooks at the right and left side portions of the waist of the robot to connect the robot with lifting bodies by hanging the hooks on the lifting bodies. In a state where the robot is just hung on the hooks, however, the robot easily swings back and forth with the hooks as a fulcrum and is incapable of maintaining a stable state.

SUMMARY OF THE INVENTION

It is an object of the present invention to provide a connection structure between a lifted body and a lifting device having improved workability and stability.

According to an aspect of the present invention, there is provided a connection structure between a lifted body and a lifting device for lifting and lowering the lifted body, the lifting device including a pair of lifting bodies which move up and down on the right and left outer sides of the lifted body to connect the right and left side portions of the lifted body to the lifting bodies, respectively, wherein each of the lifting bodies includes a rod-like lifting arm extending in an anteroposterior direction, wherein there is provided gripping means for gripping each of the lifting arms by catching the lifting arm from above and below at each of the right and left side portions of the lifted body, wherein the gripping means includes: a base rack fixed to each of the side portions of the lifted body; a first gripping piece, which is swingably connected to the base rack via a first shaft extending in the anteroposterior direction and which has a gripper contactable with the lifting arm from below at a distal end of the first gripping piece; and a second griping piece, which is swingably connected to a portion between the first shaft and the gripper of the first gripping piece via a second shaft parallel to the first shaft and which has a gripper contactable with the lifting arm from above at a distal end of the second gripping piece, and wherein, in a state where the lifting arm is separated from the lifted body, the first gripping piece is located outwardly of a vertical projective space of the lifting arm and the gripper of the second gripping piece is located within the vertical projective space of the lifting arm, and the first gripping piece is lifted via the second gripping piece because the second gripping piece is pushed up with the lifting arm abutting against the gripper of the second gripping piece from below due to the lifting of the lifting arm, by which the gripper of the first gripping piece abuts against the lifting arm from below.

According to the present invention, when each of the lifting bodies of the lifting device is moved up in a state where each lifting arm is separated from the lifted body, the second gripping piece is pushed up with the lifting arm of the lifting body abutting against the gripper of the second gripping piece from below. When the lifting arm pushes up the second gripping piece, the first gripping piece is also lifted around the first shaft toward the second gripping piece side as if the first gripping piece were dragged by the second gripping piece via the second shaft, by which the gripper of the first gripping piece abuts against the lifting arm from below.

Thereby, the lifting arm is gripped from above and below between the second gripping piece and the first gripping piece and the lifted body is lifted in this state. In the state where the lifted body is lifted, the lifting arm pushes up the second gripping piece with a force equivalent to the empty weight of the lifted body, and the first gripping piece is pulled up with the upward force, and therefore the gripping means firmly grips the lifting arm from above and below.

When the lifted body is lowered, each lifting arm is moved down. Then, the lifting arm is further moved down after the lifted body comes in contact with the ground, which inhibits the upward force of the lifting arm from being applied to the second gripping piece. Thereby, the first gripping piece swings around the first shaft in such a way as to hang down gradually by its own weight along with the lowering of the lifting arm, and finally the first gripping piece is located outwardly of the vertical projective space of the lifting arm and the second lifting piece upwardly gets away from the lifting arm. This releases the gripping of the lifting arm caused by the gripping means, thereby releasing the connection between the lifting device and the lifted body.

As described above, according to the present invention, the gripping means grips the lifting arm for connection only by moving up the lifting arm of the lifting device and the connection between the gripping means and the lifting arm is released only by moving down the lifting arm, which eliminates the need for performing a special work of fixing the lifted body to the lifting bodies of the lifting device and thus improves workability.

Since the gripping means firmly grips the lifting arm from above and below, it is possible to prevent the lifted body from swinging in the anteroposterior direction around an axis between the right and left gripping means relative to the lifting arms, thereby improving the stability.

The gripping of the lifting arms from above and below by the gripping means, however, could lead to a shift of the gripping means in the anteroposterior direction along the lifting arms. In this case, it is possible to prevent the shift of the lifted body in the anteroposterior direction along the lifting arms by providing a convex portion projecting upwardly in a portion of the lifting arm which comes in contact with the second gripping piece and providing the second gripping piece with a cutout portion for receiving the convex portion, due to abutment between the convex portion and the anteroposterior side edges of the cutout portion.

Moreover, if an inertial force in the push-up direction is applied to the lifted body due to vibration or the like during moving of the lifting device, the first gripping piece swings in a direction of deviating from the under surface of the lifting arm due to relative moving up to the lifting arm and the second gripping piece rises from the lifting arm, which causes the lifted body to wobble vertically.

In this case, if the convex portion is formed in such a way that an upper part thereof is exposed above the second gripping piece and a groove is formed in the portion exposed above of the convex portion in a state where the cutout portion receives the convex portion, and the lifting body is provided with a catch lock having an engagement body free to be engaged with the groove over the second gripping piece, it is possible to prevent the lifted body from wobbling vertically since the engagement body holds the second gripping piece from above so as not to rise relative to the lifting arm even if the inertial force in the push-up direction is applied to the lifted body.

The gripping means may be provided on each lifting body. More specifically, the present invention may be a connection structure between a lifted body and a lifting device for lifting and lowering the lifted body, the lifting device including a pair of lifting bodies which move up and down on the right and left outer sides of the lifted body to connect the right and left side portions of the lifted body to the lifting bodies, respectively, wherein the lifted body is provided at each of the right and left side portions with a rod-like member extending in an anteroposterior direction, wherein each of the lifting bodies is provided with gripping means for gripping the rod-like member by catching the rod-like member from above and below, wherein the gripping means includes: a base rack fixed to each of the lifting bodies; a first gripping piece, which is swingably connected to the base rack via a first shaft extending in the anteroposterior direction and which has a gripper contactable with the rod-like member from above at a distal end of the first gripping piece; and a second griping piece, which is swingably connected to a portion between the first shaft and the gripper of the first gripping piece via a second shaft parallel to the first shaft and which has a gripper contactable with the rod-like member from below at a distal end of the second gripping piece, and wherein, in a state where the rod-like member is separated from the gripping means, the first gripping piece is located outwardly of a vertical projective space of the rod-like member and the gripper of the second gripping piece is located within the vertical projective space of the rod-like member, and the first gripping piece is lowered via the second gripping piece because the second gripping piece is pushed down with the gripper of the second gripping piece abutting against the rod-like member from below due to the lifting of the lifting body, by which the gripper of the first gripping piece abuts against the rod-like member from above.

According to the present invention, only lifting and lowering of the lifting bodies of the lifting device enables the gripping means to grip the rod-like member firmly and thereby achieve the connection or releases the connection between the gripping means and the rod-like member, thereby improving the workability. Since the gripping means firmly grips the rod-like member from above and below, it is possible to prevent the lifted body from wobbling in the anteroposterior direction around the axis between the right and left rod-like members relative to the lifting bodies.

DETAILED DESCRIPTION OF THE PREFERRED EMBODIMENTS

A first embodiment of a connection structure between a lifting device and a lifted body according to the present invention will now be described in detail hereinafter by using a lifting device 2 for lifting and lowering a humanoid robot 1 as a lifted body shown in FIG. 1 and FIG. 2.

Figure 2:
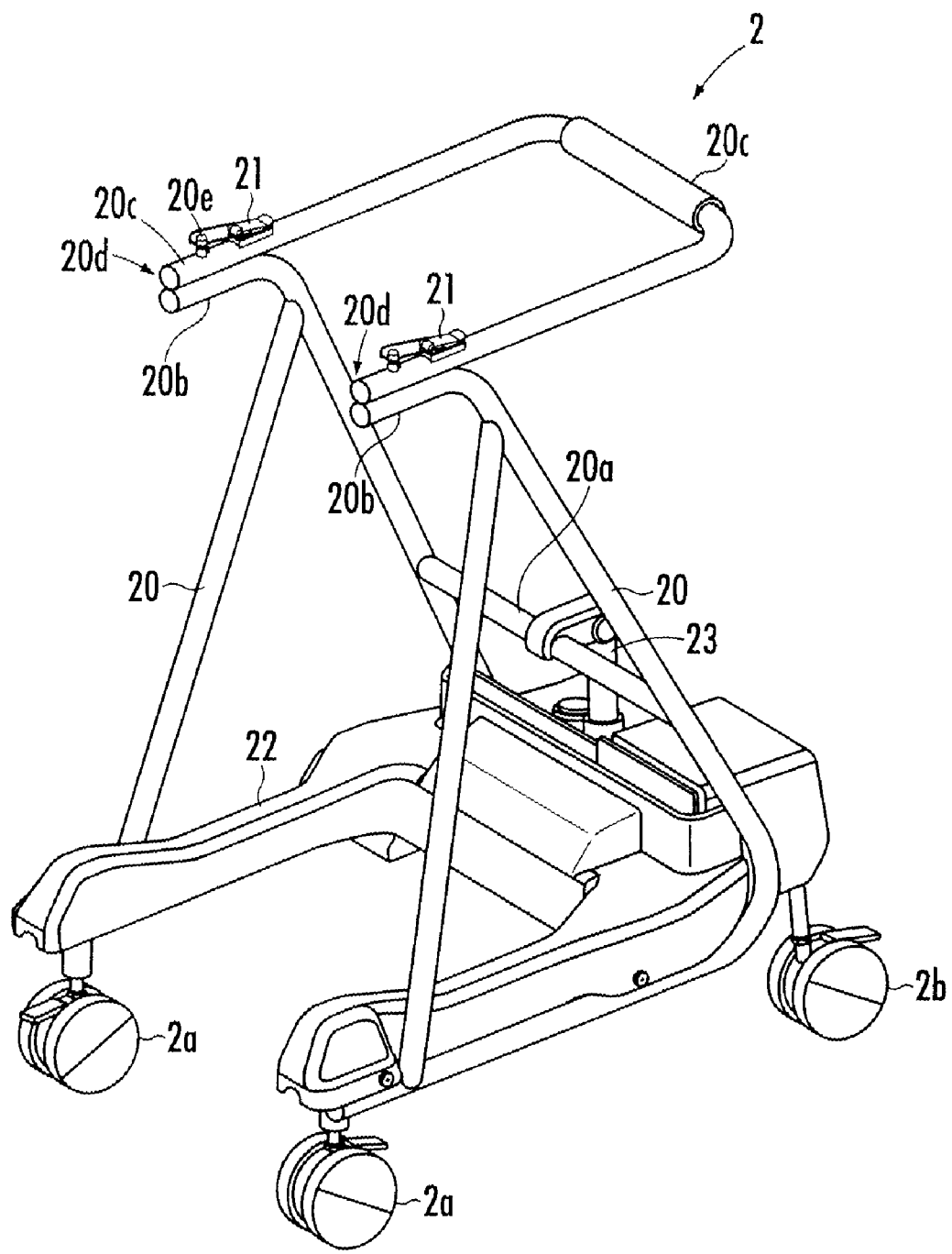
FIG. 2 is a perspective diagram illustrating a lifting device according to the first embodiment of the present invention.

Referring to FIG. 2, the lifting device 2 includes a pair of right and left front casters 2a, a pair of right and left rear casters 2b, and a pair of right and left lifting frames 20, 20, each having a substantially triangular shape in the side view, which move up and down relative to the casters 2a and 2b. The lifting frames 20, 20 are connected together with a space therebetween larger than the horizontal widths of the legs, waist 1a, and body of the robot 1, via a connection frame 20a at the rear of the lifting device 2. In the first embodiment, the lifting frames 20, 20 correspond to the lifting bodies of the present invention.

There is provided a horizontal rod-like portion 20b, which extends forward, at the top of each lifting frame 20. The horizontal rod-like portions 20b are welded to the right and left ends of a substantially U-shaped handle 20c which extends rearward, respectively. In the first embodiment, the horizontal rod-like portion 20b and the end of the handle 20c constitute each lifting arm 20d in the first embodiment.

The lifting arm 20d is provided with a convex portion 20e which projects upwardly. The convex portion 20e has a groove 20f formed on the front thereof. In addition, there is provided a catch lock 21 having an engagement body 21a free to be engaged with the groove 20f on the convex portion 20e in the rear from the convex portion 20e of the lifting arm 20d.

The respective lower edges of the lifting frames 20, 20 and the portion between the rear ends of the lower edges of the lifting frames 20, 20 are covered with a cover 22. A base frame (not shown) with rear casters 2b attached thereto is disposed in the portion covered with the cover 22 between the rear ends of the lower edges of the lifting frames 20, 20. A lifting motor, which is not shown, is mounted on the base frame, and a lifting rod 23, which is lifted and lowered via a ball screw mechanism (not shown) by the lifting motor, is connected to the connection frame 20a. Then, the lifting motor causes the rears of the lifting frames 20, 20 to move up and down relative to the base frame, namely the rear casters 2b, 2b in synchronization with each other via the lifting rod 23 and the connection frame 20a.

Each front caster 2a is connected to the front end of the lower edge of each lifting frame 20 so as to be free to move up and down. The part covered with the cover 22 includes a link mechanism (not shown) which moves the front casters 2a up and down relative to the front ends of the lower edges of the lifting frames 20, 20 in response to the up and down movement of the rears of the lifting frames 20, 20 relative to the base frame. When the rears of the lifting frames 20, 20 are moved up and down relative to the rear casters 2b, the fronts of the lifting frames 20, 20 move up and down, with a stroke equivalent to that of the rears, relative to the front casters 2a, and thus the lifting arms 20d of the lifting frames 20, 20 are lifted and lowered with the horizontal position maintained.

Figure 1:
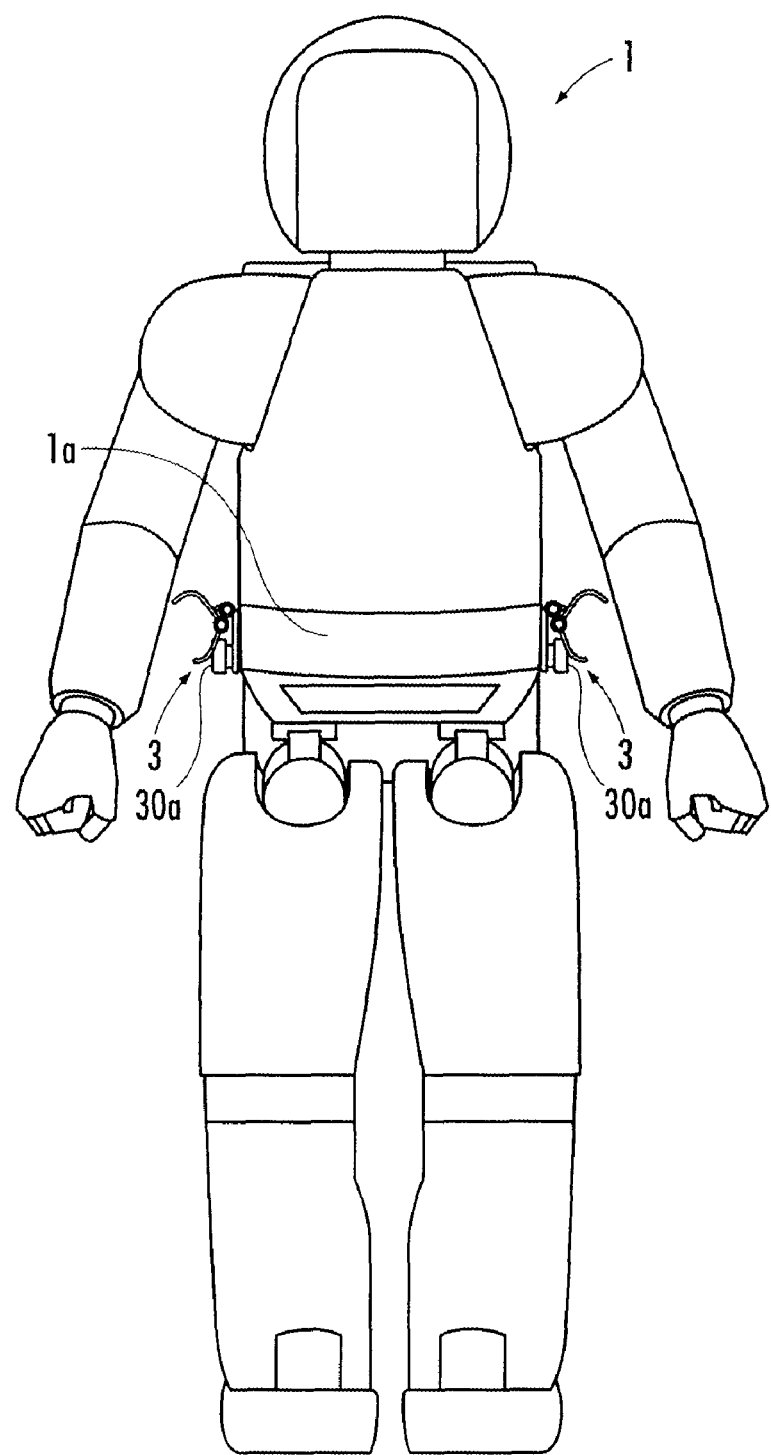
FIG. 1 is an explanatory diagram illustrating a lifted body according to a first embodiment of the present invention.
Figure 3:
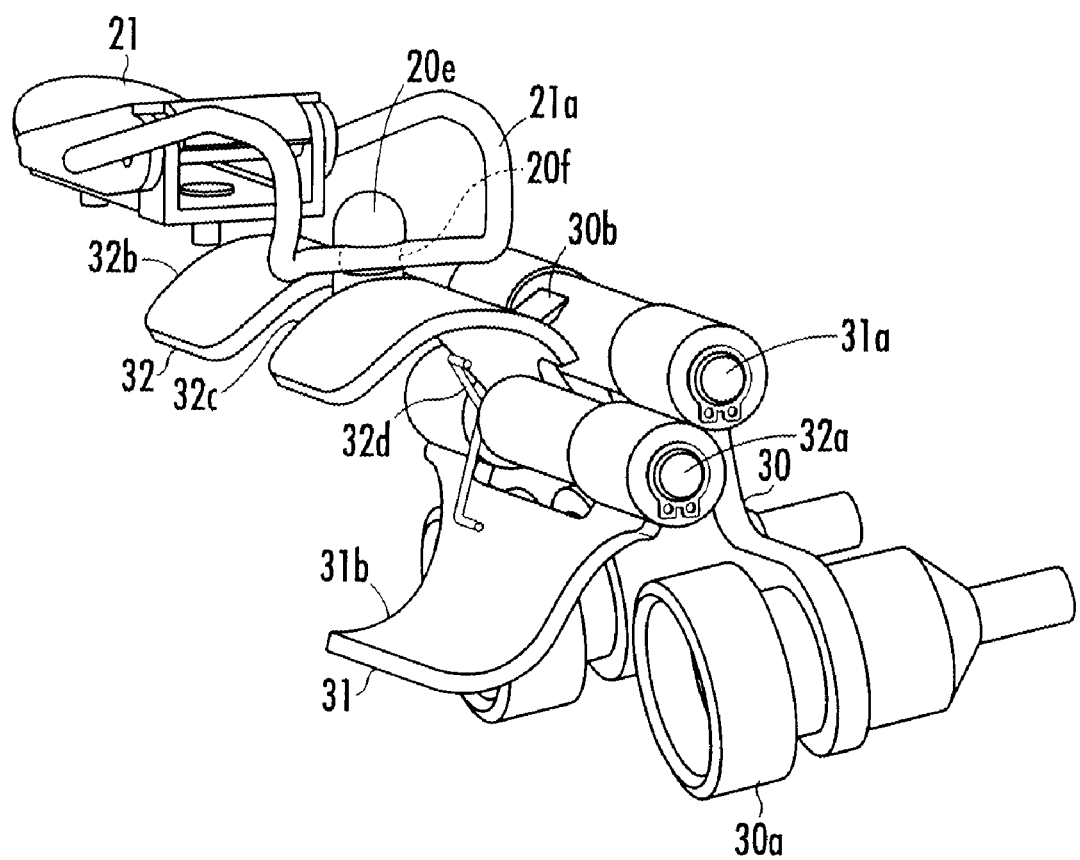
FIG. 3 is a perspective diagram illustrating gripping means according to the first embodiment.

As shown in FIG. 1, there are provided gripping means 3 at the right and left side portions of the waist 1a of the robot 1. The gripping means 3 includes a base rack 30, a first gripping piece 31, and a second gripping piece 32, as shown in FIG. 3. The base rack 30 is fixed to each of the right and left side portions of the robot 1 with a bolt 30a. The top end of the base rack 30 is swingably connected to the first gripping piece 31 via a first shaft 31a which extends in an anteroposterior direction. There is formed an arc-shaped gripper 31b contactable with the lifting arm 20d from below at the distal end of the first gripping piece 31.

The second gripping piece 32 is swingably connected to the portion between the first shaft 31a and the gripper 31b of the first gripping piece 31 via a second shaft 32a which is parallel to the first shaft 31a. There is formed an arc-shaped gripper 32b contactable with the lifting arm 20d from above at the distal end of the second gripping piece 32.

There is formed a cutout portion 32c, which is cut away in such a way as to receive the convex portion 20e of the lifting arm 20d from the distal end edge toward the second shaft 32a, in the gripper 32b of the second gripping piece 32. The convex portion 20e is formed in such a way that the groove 20f is exposed above the gripper 32b when the cutout portion 32c receives the convex portion 20e. The gripping means 3 is provided with a spring 32d for biasing the second gripping piece 32 in a direction of opening the second gripping piece 32 relative to the first gripping piece 31. FIG. 3 shows the convex portion 20e and the catch lock 21 with the lifting arm 20d omitted.

Figure 4:
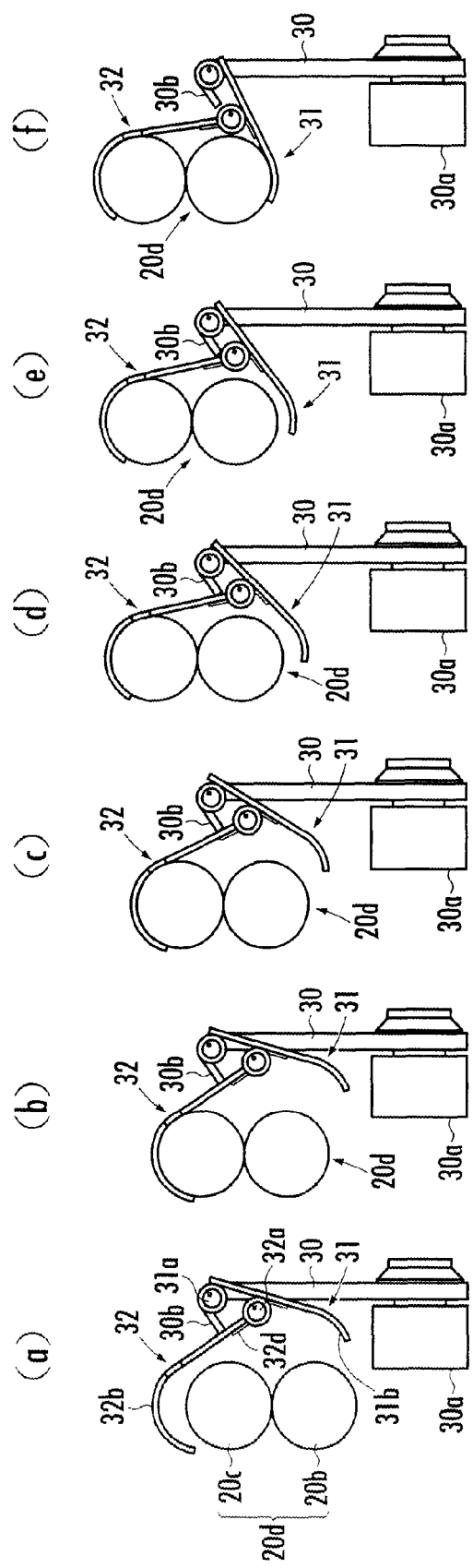
FIG. 4 is an explanatory diagram illustrating how a lifting arm is connected to the gripping means according to the first embodiment.

The first gripping piece 31 hangs down by its own weight in a state where the lifting arm 20d is separated from the gripping means 3 of the robot 1. In this condition, the first gripping piece 31 is adapted to be located outwardly of the vertical projective space of the lifting arm 20d as shown in FIG. 4(a), with the robot 1 placed inside the lifting frames 20, 20. The gripper 32b of the second gripping piece 32 is positioned by a stopper 30b provided at the upper end of the base rack 30 in such a way as to be located within the vertical projective space of the lifting arm 20d.

Where the robot 1 is lifted by the lifting device 2, the lifting device 2 is moved so that the robot 1 enters the space between the lifting frames 20, 20, first. Then, the lifting arms 20d, 20d of the lifting frames 20, 20 are moved up in synchronization with each other by the operation of the lifting motor. According to the above, the lifting arm 20d abuts against the second gripping piece 32, which is located within the vertical projective space of the lifting arm 20d, from below as shown in FIG. 4(b), and then the second gripping piece 32 is pushed up as shown in FIG. 4(c) to 4(f) due to continued moving up of the lifting arm 20d. Thereafter, the first gripping piece 31 is pulled up following the push-up of the second gripping piece 32, and thereby the lifting arm 20d is put between the first gripping piece 31 and the second gripping piece 32 from above and below as shown in FIG. 4(f).

This connects the lifting device 2 with the robot 1. The robot 1 is lifted by further moving up the lifting frames 20, 20 in this condition. Then, the engagement body 21a of the catch lock 21 is engaged with the groove 20f of the convex portion 20e over the second gripping piece 32. In the state where the robot 1 is lifted, the second gripping pieces 32, 32 are pushed up with a force equivalent to the empty weight of the robot 1 by the lifting arms 20d, 20d and the first gripping pieces 31, 31 are lifted by the push-up force, whereby the gripping means 3, 3 firmly grip the lifting arms 20d, 20d from above and below.

The cutout portion 32c thus receives the convex portion 20e and thereby the convex portion 20e abuts against the anteroposterior side edges of the cutout portion 32c, which prevents the robot 1 from shifting in the anteroposterior direction along the lifting arm 20d.

Even if an inertial force acts on the robot 1 in the push-up direction, the engagement body 21a holds down the second gripping piece 32 from above so as not to rise relative to the lifting arm 20d, which prevents the robot 1 from wobbling in the vertical direction.

Where the robot 1 is lowered, the lifting frames 20, 20 are moved down after releasing the engagement between the engagement body 21a of the catch lock 21 and the groove 20f. When the robot 1 comes in contact with the ground, the push-up of the second gripping piece 32 caused by the lifting arm 20d is released. Therefore, the first gripping piece 31 gradually swings down around the first shaft 31a by its own weight, as shown in FIG. 4(e) to 4(a). Finally, as shown in FIG. 4(a), the second gripping piece 32 departs from the lifting arm 20d without moving down by its own weight since the second gripping piece 32 is located outwardly of the vertical projective space of the lifting arm 20d and is biased by the spring 32d in the direction that the second gripping piece 32 gets away from the first gripping piece 31. This releases the connection between the lifting device 2 and the robot 1.

According to the connection structure between the lifting device 2 and the robot 1 according to the first embodiment, the gripping means 3, 3 grip the lifting arms 20d, 20d, thereby connecting the lifting device 2 and the robot 1, only by moving up the lifting frames 20, 20 of the lifting device 2. The connection between the gripping means 3, 3 and the lifting arms 20d, 20d is easily released only by moving down the lifting frames 20, 20. Therefore, according to the connection structure between the lifting device 2 and the robot 1 of the first embodiment, there is no need to perform any special work of fixing the robot 1 to the lifting arm 20d of the lifting device 2, thereby improving the workability.

Since each gripping means 3 firmly grips each lifting arm 20d from above and below, it is possible to prevent the robot 1 from swinging in the anteroposterior direction around the waist 1a relative to the lifting arms 20d, 20d, thereby improving the stability.

Figure 5:
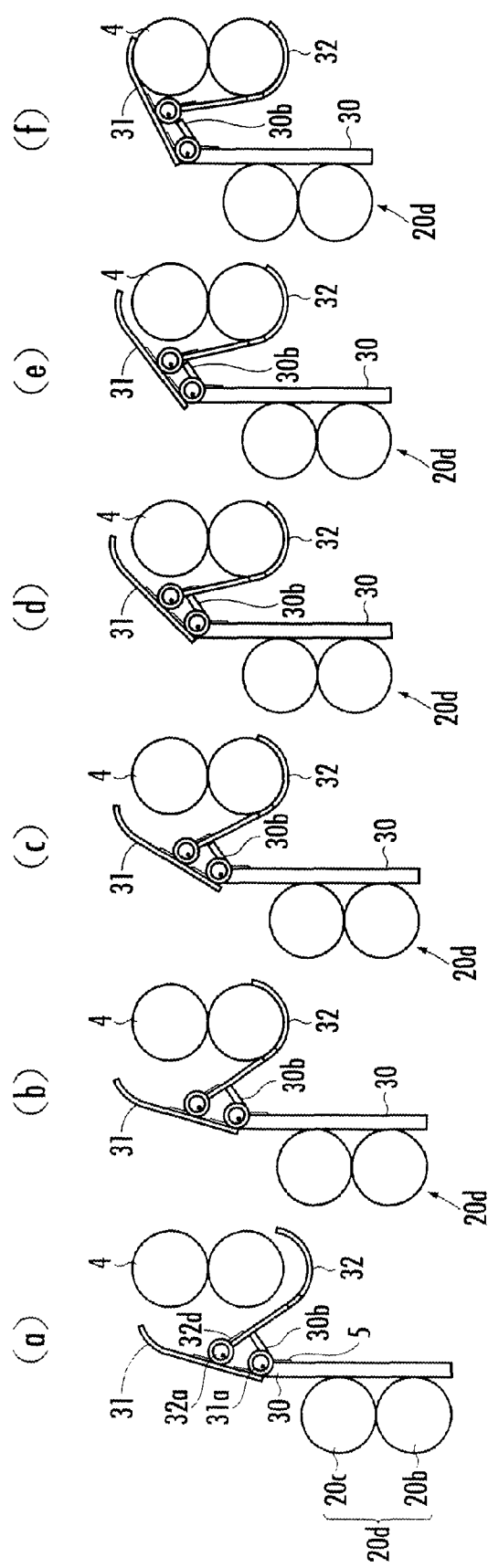
FIG. 5 is an explanatory diagram illustrating a second embodiment of a connection structure between the lifting device and the lifted body of the present invention.

Although the gripping means 3 is provided at each of the right and left side portions of the waist 1a of the robot 1 in the first embodiment, the gripping means 3 may be provided at each lifting frame 20 of the lifting device 2 via the lifting arm 20d. FIG. 5 shows this structure as a second embodiment. The same components as the first embodiment are designated by the same reference numerals in the following description.

As shown in FIG. 5, the gripping means 3 of the second embodiment is upside down relative to the first embodiment with respect to the first gripping piece 31 and the second gripping piece 32. Moreover, there is provided a rod-like member 4 gripped by the gripping means 3 at each of the right and left side portions of the waist 1a of the robot 1. As shown in FIG. 5(a), the gripping means 3 is provided with a spring 5 for biasing the first gripping piece 31, which is located upper than the second gripping piece 32, in a direction of separating the first gripping piece 31 from the rod-like member 4 around the first shaft 31a so as to be positioned outwardly of the vertical projective space of the rod-like member 4 without lowering the first gripping piece 31 by its own weight. Components other than the above are the same as those of the first embodiment.

Where the robot 1 is lifted by the lifting device 2 of the second embodiment, the lifting device 2 is moved so that the robot 1 enters the space between the lifting frames 20, 20, first. Then, gripping means 3, 3 are moved up in synchronization with each other by the operation of the lifting motor (not shown) via the lifting arms 20d, 20d of the lifting frames 20, 20.

According to the above, the second gripping piece 32 of each gripping means 3, which is located within the vertical projective space of each rod-like member 4, abuts against the rod-like member 4 from below as shown in FIG. 5(b), and then the second gripping piece 32 is pushed down as shown in FIG. 5(c) to 5(f) due to continued moving up of the lifting arm 20d. Thereafter, the first gripping piece 31 is pulled down following the push-down of the second gripping piece 32, and thereby the rod-like member 4 is put between the first gripping piece 31 and the second gripping piece 32 from above and below as shown in FIG. 5(f).

This connects the lifting device 2 with the robot 1. The robot 1 is lifted by further moving up the lifting frames 20, 20 in this condition. In the state where the robot 1 is lifted, the second gripping pieces 32, 32 are pushed down with the empty weight of the robot 1 by the rod-like members 4, 4, and the first gripping pieces 31, 31 are lowered by the push-down force, whereby the gripping means 3, 3 firmly grip the rod-like member 4, 4 from above and below.

Where the robot 1 is lowered, the lifting frames 20, are moved down. When the robot 1 comes in contact with the ground, the push-down of the second gripping piece 32 caused by the abutment against the rod-like member 4 is released. Therefore, the first gripping piece 31 gradually swings up around the first shaft 31a by the biasing force of the spring 5 as shown in FIG. 5(e) to 5(a). Finally, as shown in FIG. 5(a), the second gripping piece 32 gradually swings downward around the second shaft 32a and departs from the rod-like member 4 since the second gripping piece 32 is located outwardly of the vertical projective space of the rod-like member 4 and is biased by the spring 32d in the direction that the second gripping piece 32 gets away from the first gripping piece 31. This releases the connection between the lifting device 2 and the robot 1.

It is possible to achieve the operation and effect of the present invention of improving the workability and stability in the same manner as the first embodiment through the connection structure between the lifting device 2 and the robot 1 according to the second embodiment.

Although the gripping means 3 is provided with the spring 32d for biasing the second gripping piece 32 in the direction of getting away from the first gripping piece 31 in the connection structure between the lifting device 2 and the robot 1 of the second embodiment, alternatively the second gripping piece 32 may be adapted to swing downward around the second shaft 32a by its own weight, without the provision of the spring 32d in the gripping means 3.

It is also possible to provide the rod-like member 4 with a convex portion that projects upwardly and to form a cutout portion for receiving the convex portion in the first gripping piece 31 to prevent the gripping means 3 from shifting back and forth along the rod-like member 4.

It is possible to form a groove on the front of the above convex portion and to provide a catch lock having an engagement body, which is engaged with the groove over the first gripping piece 31, behind the convex portion of the rod-like member 4, with each gripping means 3 gripping the rod-like member 4. This inhibits the first gripping piece 31 from rising relative to the rod-like member 4 since the engagement body of the catch lock holds the first gripping piece 31 from above even if an inertial force acts on the robot 1 in a push-up direction, thereby preventing the robot 1 from vertically wobbling.

What is claimed is:

1. A connection structure between a lifted body and a lifting device for lifting and lowering the lifted body, the lifting device including a pair of lifting bodies configured to move up and down on right and left outer sides of the lifted body to connect right and left side portions of the lifted body to the lifting bodies, respectively, wherein each of the lifting bodies include a lifting arm extending in an anteroposterior direction, wherein there is provided gripping means for gripping each of the lifting arms by catching the lifting arm from above and below at each of the right and left side portions of the lifted body, wherein the gripping means includes: a base rack fixed to each of the side portions of the lifted body; a first gripping piece, which is swingably connected by a first shaft to the base rack, the first shaft extending in the anteroposterior direction, the first gripping piece having a gripper contactable with the lifting arm from below at a distal end of the first gripping piece; and a second gripping piece, which is swingably connected by a second shaft to a portion between the first shaft and the gripper of the first gripping piece, said second shaft being parallel to the first shaft, the second gripping piece having a gripper contactable with the lifting arm from above at a distal end of the second gripping piece, and wherein, in a state where the lifting arm is separated from the lifted body, the first gripping piece is adapted to be located outwardly of a vertical projective space of the lifting arm and the gripper of the second gripping piece is adapted to be located within the vertical projective space of the lifting arm, and wherein the first gripping piece is adapted to be lifted so as to abut against the lifting arm from below as the second gripping piece is pushed up by the lifting arm as the lifting arm is lifted while abutting against the gripper of the second gripping piece from below.

2. The connection structure between the lifted body and the lifting device according to claim 1, wherein a convex portion projecting upwardly is provided in a portion of the lifting arm which comes in contact with the second gripping piece and wherein the second gripping piece is provided with a cutout portion for receiving the convex portion.

3. The connection structure between the lifted body and the lifting device according to claim 2, wherein the convex portion is formed in such a way that an upper part thereof is exposed above the second gripping piece and a groove is formed in the upper part exposed above of the second gripping piece, in a state where the cutout portion receives the convex portion; and wherein the lifting body is provided with a catch lock having an engagement body free to be engaged with the groove over the second gripping piece.

* * * * *